No. 725,905. PATENTED APR. 21, 1903.
W. N. WILLIAMS.
SHOVEL.
APPLICATION FILED JULY 31, 1902.
NO MODEL.
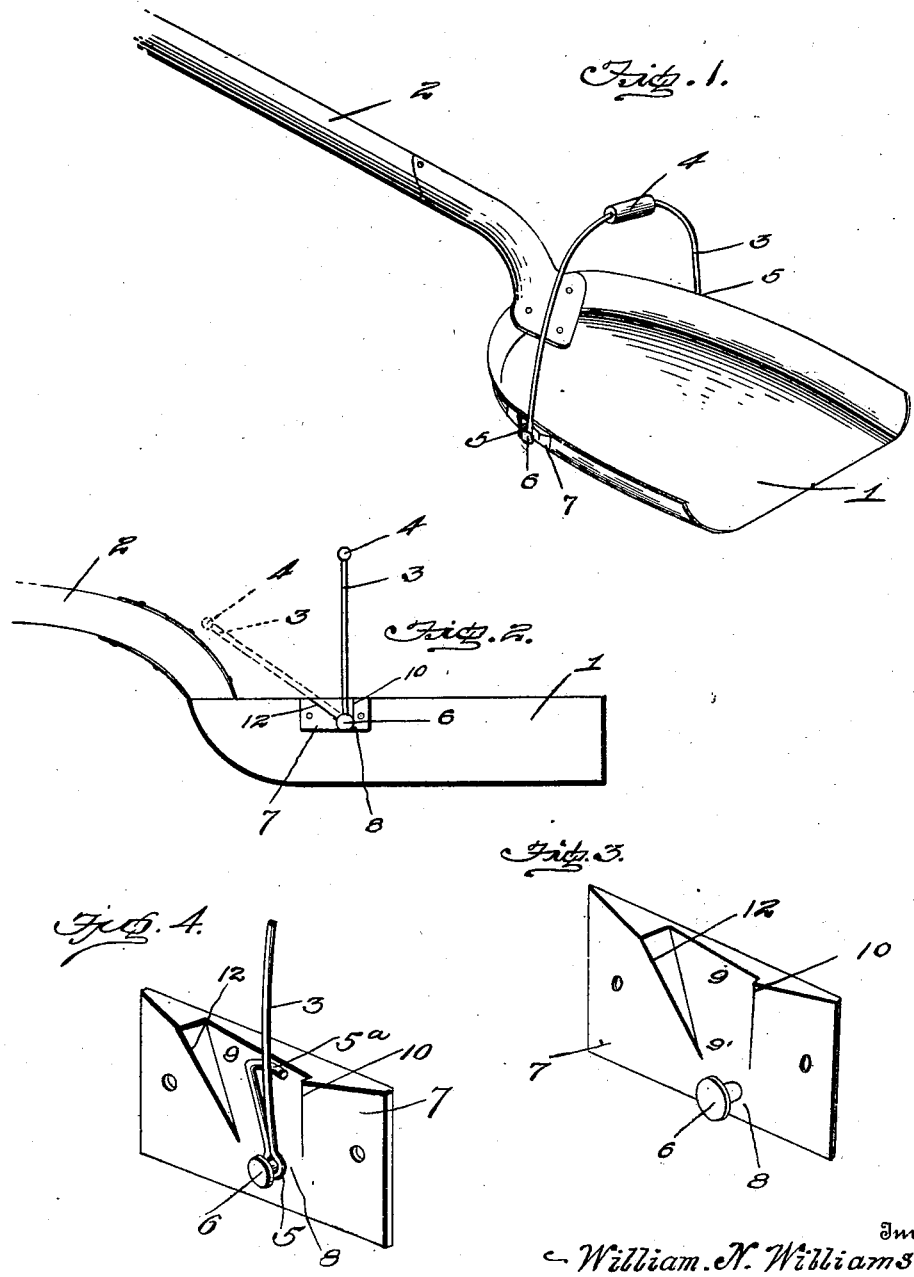
Inventor
William N. Williams
Witnesses

UNITED STATES PATENT OFFICE.

WILLIAM N. WILLIAMS, OF WELCOME, MINNESOTA.

SHOVEL.

SPECIFICATION forming part of Letters Patent No. 725,905, dated April 21, 1903.

Application filed July 31, 1902. Serial No. 117,861. (No model.)

*To all whom it may concern:*

Be it known that I, WILLIAM N. WILLIAMS, a citizen of the United States, residing at Welcome, in the county of Martin and State of Minnesota, have invented certain new and useful Improvements in Shovels; and I do declare the following to be a full, clear, and exact description of the invention, such as will enable others skilled in the art to which it appertains to make and use the same.

This invention relates to improvements in shovels.

The object of the invention is to provide means whereby the operation of shoveling, lifting, and carrying may be carried on more easily and to better advantage.

A further object of the invention is to provide an attachment for a shovel which will be simple in construction, durable in use, inexpensive, which may be attached to any shovel, and which is well adapted to the purpose for which it is used.

With these and other objects in view the invention consists of the construction and arrangement of the parts, as will be hereinafter more fully described and claimed, reference being had to the accompanying drawings, in which—

Figure 1 is a perspective view of a shovel having the invention applied thereto. Fig. 2 is a side elevation of the same, showing by broken lines the lowered position of the bail; and Fig. 3 is a detail view of the bail-attaching plate. Fig. 4 is a similar view of the attaching-plate, showing a modified form of bail end.

In the drawings, 1 denotes the scoop, and 2 the handle, of an ordinary scoop-shovel, and 3 denotes an auxiliary swinging handle or bail, preferably in the shape of a bow and formed of a wire rod having a centrally-disposed grip 4.

The ends of the wire bail are formed with eyes 5, which are adapted to engage headed studs 6, integral with or fixed to attaching-plates 7, which are in turn riveted to the sides of the shovel. The ends of the plates 7 are beveled to an edge, leaving a thicker or projecting central portion 8, from which project the studs 6. The outer face of this thicker portion of the plate is cut away from the top edge downwardly and outwardly, forming a depression 9, the back wall 9' of which is beveled from the top edge downwardly and outwardly to the outer face of the plate and is also beveled from front to rear, as shown. The forward wall 10 of the depression is vertical; but the rear wall or that toward the handle is inclined, as shown at 12, the object of this being to allow the bail to fall back when not in use toward the handle of the shovel and in proper position to be grasped by the hand of the operator when desired. The beveled back wall 9' of the plate is of such shape that it will, owing to the resiliency or spring of the sides of the shovel, cause the bail to be thrown back toward the handle, as shown in dotted lines in Fig. 2 of the drawings, when released by the operator.

In Fig. 4 of the drawings I have illustrated a modified form of bail end. In this case instead of forming the end of the bail with eyes to engage the studs 6 I form the same with loops and bring the end of the wire upwardly and then bend the same forwardly, forming a hook-shaped bearing-surface $5^a$ between the bail and the attaching-plate, the object of this being to prevent wear upon the bail caused by swinging of the same against the plate, and thereby greatly lengthening the life of the attachment.

In use when the shovel has been forced into the material that is to be shoveled the handle of the bail is grasped and the bail raised and the load lifted and carried or thrown to the place of discharge.

It will be seen that the old method of using the hand nearest the scoop as a fulcrum is now done away with and that by use of the bail the load may be much more easily carried and thrown to a greater distance than by the common construction of shovel now in use.

From the foregoing description, taken in connection with the accompanying drawings, the operation and advantages of my improved attachment will be readily understood.

Various changes in the form, minor details of construction, and general arrangement of the device may be made within the scope of the invention without departing from the spirit or sacrificing any of the advantages of the invention.

Having thus described my invention, what I claim, and desire to secure by Letters Patent, is—

1. The combination with a shovel, of a swinging handle having a hinged connection with the scoop of said shovel, and means for automatically returning said handle, and supporting the same in a normal position after use, substantially as shown and for the purpose described.

2. The combination with a shovel-scoop, of attaching-plates fixed thereto and provided with studs projecting therefrom, each of said plates also having formed therein a depression, having a downwardly, outwardly and rearwardly inclined back wall, a vertical forward wall and an inclined rear wall, a swinging handle pivotally connected to said studs, the inclined back and rear walls of said plates being adapted to return said handle automatically and to support it in normal position after use, substantially as shown and for the purpose described.

In testimony whereof I have hereunto set my hand in presence of two subscribing witnesses.

WILLIAM N. WILLIAMS.

Witnesses:
A. W. GAMBLE,
J. E. BLAIR.